United States Patent [19]

Kaliski et al.

[11] 4,241,142

[45] Dec. 23, 1980

[54] CLAY PIGMENT FOR COATING PAPER

[75] Inventors: Adam F. Kaliski, Hightstown; Richard R. Berube, Cliffwood; John C. Nease, Califon, all of N.J.

[73] Assignee: Engelhard Minerals & Chemicals Corporation, Edison, N.J.

[21] Appl. No.: 971,365

[22] Filed: Dec. 20, 1978

Related U.S. Application Data

[60] Continuation of Ser. No. 931,544, Aug. 7, 1978, which is a continuation of Ser. No. 832,727, Sep. 12, 1977, abandoned, which is a division of Ser. No. 587,606, Jun. 17, 1975, abandoned.

[51] Int. Cl.³ .................... B05D 3/02; B05D 3/12; B32B 23/08; B32B 27/10
[52] U.S. Cl. ........................ 428/511; 106/72; 106/288 B; 260/17.4 ST; 427/361; 427/391; 427/395; 428/514; 428/533
[58] Field of Search ............. 106/72, 288 B; 427/361, 427/391, 395; 428/511, 514, 533; 260/17.4 ST

[56] References Cited

U.S. PATENT DOCUMENTS

| | | | |
|---|---|---|---|
| 3,171,718 | 3/1965 | Gunn et al. | 106/288 B |
| 3,635,662 | 1/1972 | Lyons | 106/288 B |
| 3,816,153 | 6/1974 | Zentz | 106/288 B |
| 4,125,411 | 11/1978 | Lyons | 106/288 B |

FOREIGN PATENT DOCUMENTS 1210391  10/1970  United Kingdom ............... 106/288 B

*Primary Examiner*—Michael R. Lusignan
*Attorney, Agent, or Firm*—Inez L. Moselle

[57] ABSTRACT

A novel clay pigment, the manufacture thereof and the use of the pigment in the production of dull and matte-finish coated printing papers. The novel clay pigment comprises a mixture of a coarse-size fraction of naturally-occurring kaolin clay containing a substantial proportion of kaolinite booklets in the particle size range of 2 to 5 μm equivalent spherical diameter (e.s.d.) and mechanically delaminated kaolin platelets in the particle size range of 2 to 10 μm e.s.d.

15 Claims, No Drawings

CLAY PIGMENT FOR COATING PAPER

This is a continuation of application Ser. No. 931,544, filed Aug. 7, 1978, which in turn is a continuation of Ser. No. 832,727 filed Sept. 12, 1977, abandoned which in turn is a division of Ser. No. 587,606 filed June 17, 1975, abandoned.

BACKGROUND OF THE INVENTION

This invention relates generally to clay pigments useful in the production of coated printing paper. In particular, this invention is concerned with a novel kaolin clay pigment composition adapted for use in the production of coated printing papers having dull and matte finishes.

A wide variety of coated printing papers is produced commercially. Such papers are prepared by coating suitable basestock with a pigmented coating composition. The coating composition is frequently called a "coating color." Among the principal properties of paper which are affected by applying the coating are smoothness, ink receptivity and gloss.

In recent years most of the coated paper has been used for advertising matter, periodicals, etc. This type of paper usually has a high gloss, i.e., paper having a TAPPI (75°) gloss of 50% or above. The glossy finish is desired to emphasize contrasts in half-tone prints and to satisfy aesthetic demands. Fine particle size kaolin clay, e.g., clay that is at least 80% by weight finer than 2 $\mu$m, e.s.d., is usually the main or sole constituent of the pigment employed in the production of high-gloss coated printing paper. A coating color containing the fine particle size clay pigment is applied to suitable base paper. The coated paper is dried and subjected to supercalendering. Such calendering serves to produce a smooth surface which responds well to printing. Calendering also serves to develop the desired high-gloss finish.

There is an increasing demand for coated printing papers which have a lower gloss-finish than the present glossy sheets. These lower-gloss sheets are of two general types. One is a dull-finish sheet. Dull-finish is generally defined as a paper which has a TAPPI (75°) gloss in the range of about 20% to 35%. Presently available dull-finish printing paper is obtained by using a blend of a calcium carbonate pigment, usually a precipitated grade, with a conventional coating grade of kaolin clay, e.g., kaolin clay that is about 80% by weight finer than 2 $\mu$m. Coating is followed by a finishing operation which is usually a light calendering operation. This necessitates the use of highly specialized calendering techniques and/or equipment. The finishing operation is used to increase the smoothness of the surface of the sheet to facilitate printing. The degree of calendering is less than that which would produce optimum printing smoothness. Consequently, special quality paper basestocks are usually used in the production of dull-finish printing paper. The second type of low-gloss paper is so-called "matte" finish paper. Matte coated paper has a TAPPI gloss in the range of 0 to 15% and receives no calendering. Special basestocks are used to prepare matte-finish paper. It has been reported that the pigments used are similar to those employed in the production of conventional coated printing paper.

The prior art pigments capable of producing dull and matte-finish sheets are detrimental to one or more characteristics of the sheet. Generally, available dull and matte-finish coated paper lacks the printing properties of clay-coated glossy sheets. The most serious deficiencies of available dull and matte sheets, when compared to high gloss coated paper, are ink mottle, low surface smoothness and inadequate ink holdout (inadequate gloss of the printed image and excessive ink strike-in). Low surface smoothness and inadequate ink holdout are most severe in the case of matte-finish sheets which are not calendered and thus are not smoothed during manufacture.

PRIOR ART

It is well known that the particle size of pigments has a great effect on functional properties. It has long been recognized that in the case of kaolin clay coating pigments, the greater the amount of particles finer than 2 $\mu$m (e.s.d.) in the clay, the smoother and glossier the coating. This has been explained by the fact that particles of kaolin finer than 2 $\mu$m are basically different from kaolin particles larger than 2 $\mu$m. The 2 $\mu$m particle size is the approximate cutoff point below which kaolinite particles in a naturally occurring kaolin clay exist as thin individual crystalline plates. Above this cutoff point the kaolinite particles exist as bonded stacked aggregates of platelets (so-called "stacks" or "booklets") or, in some cases, long, worm-like assemblies of platelets.

Conventional kaolin clay crudes used as sources of pigment grades of kaolin clay contain about 40% to 60% by weight of particles finer than 2 $\mu$m after removal of grit and coarse impurities. The degritted clays are too coarse for use in the production of high-gloss paper. Conventional practice is to remove a preselected proportion of plus 2 $\mu$m particles from the finer clay particles. This is accomplished by forming the crude clay into a dispersed aqueous pulp, removing gross impurities by means such as screening, and then hydraulically fractionating the clay to remove a desired proportion of clay particles larger than 2 $\mu$m. The fractionation is usually carried out in a centrifuge in commercial operation. The overflow product from the centrifuge is a suspension having a higher percentage of finer particles than the starting clay. After bleaching (and possibly other beneficiation), the fine size fraction is sold as a paper coating pigment. When the centrifugation is controlled so as to produce a fine size fraction in which at least 90% of the particles are finer than 2 $\mu$m, the pigment is sold as a No. 1 grade. No. 2 grades are about 80% finer than 2 $\mu$m. The No. 1 grades have a higher content of platelets finer than 2 $\mu$m than do No. 2 grades. Hence, the No. 1 grades yield glossier coatings than the coarser No. 2 grades under equal calendering conditions. The underflow from the centrifuges is a coarse-size fraction of clay. Typically the underflows contain about 20% to 40% by weight of particles finer than 2 $\mu$m. Thus the underflows are composed predominantly of kaolinite stacks or booklets. Coarse-size fractions of kaolin clay crudes, exemplified by the commercial product supplied under the trade name of "No-Karb," are used to a limited extent as fillers. Frequently a portion of, or even the entire, coarse fraction is discarded because of limited demand for such clays.

It is well known that the coarse particle size fractions of kaolin clay produce low-gloss finishes when coated on paper. British Pat. No. 1,210,319 to William Windle reports results of coating paper basestock with various coarse kaolin clays. These clays contained from 10% to 25% of particles larger than 10 micrometers. At least 50% by weight of the particles in the coarse clays were 2 μm and larger. The patent shows that the sheets had gloss values of 16% to 25% (TAPPI 75°) after light calendering. The gloss values varied with the binder system and the particle size of the clay. Data in the patent indicate that all sheets coated with coarse clays were deficient in printing properties unless a specific type of calcium carbonate pigment was mixed with the coarse clay.

It is also known that when a coarse clay, such as used for filling paper, is coated on paper which is then calendered sufficiently to provide adequate smoothness for printing, the gloss values are higher than those acceptable for dull-finish paper. Without calendering, the coated sheets are too rough for use in printing.

In recent years, some of the coarse particle-size fractions of kaolin crudes have been used as feed material in the production of mechanically delaminated kaolin pigments. A suspension of a coarse particle size fraction of a kaolin crude is agitated with grinding media such as sand, plastic pellets or glass microballoons until the booklets in the feed clay are cleaved and delaminated platelets are produced. Similar results are obtained when a paste of the clay is extruded under high pressure ("superstrusion"). After the kaolinite booklets are delaminated, the suspension of clay is fractionated. A fine size fraction containing the artificially produced platelets with dimensions of 2 μm (e.s.d.) and finer is recovered. The fine size fraction is used as a paper coating pigment. It is recognized that paper coated with the fine mechanically delaminated platelets has very high gloss. Most commercial grades of fine particle size mechanically delaminated clays are sold under tradenames which include the term "sheen" in recognition of the high glossing potential of these clays. Coarse-size fractions of mechanically delaminated clays are usually discarded after recovery of the desired minus 2 μm coating fraction.

It has been proposed to delaminate kaolin stacks in a sand grinder or a "super extruder," remove the particles smaller than 2 μm, and again subject the particles greater than 2 μm to a second delamination of greater intensity and duration, followed by removal of particles minus 2 μm and finer and recovery of the remaining thin platelets predominantly in the size range of 2 to 10 μm. The resulting delaminated kaolin clay product had disclosed utility as a filler for resins, as an extender in low-sheen paints and for cosmetic powder applications. Reference is made to U.S. Pat. No. 3,615,806 to Andrew Torok and Thomas F. Walsh. It has also been proposed (U.S. Pat. No. 3,635,662 to Sanford C. Lyons) to "superstrude" (extrude under high pressure) a coarse-size fraction of a kaolin crude, fractionate the product and recover a product composed predominantly of large delaminated kaolin particle (predominantly in the range of 2 to 10 μm (e.s.d.). The large superstruded platelets have disclosed utility in the production of ultra-high-gloss coated paper. According to the teachings of U.S. Pat. No. 3,635,662, the large superstruded platelets provide high ink absorptivity in coatings as measured by the well-known "K&N" ink test. Thus, the patent suggests that the large superstruded platelets be mixed with other clays to produce coated sheets of any desired degree of ink absorptivity.

Insofar as we are aware, knowledge of the prior art as to the effects of size and structure of clay particles on paper coating properties has not resulted in the availability of clay pigments useful in the production of either dull or matte-finish coated paper having printing properties comparable to that of commercial, glossy, coated paper.

THE INVENTION

The instant invention is based on the concept of controlling particle shape as well as particle size and particle-size distribution to provide a unique clay composition useful as the principal pigment in the production of dull and matte-finish coated paper having printing and optical properties comparable to those of high quality glossy paper.

Briefly stated, one aspect of the present invention relates to a novel coating clay pigment. The novel pigment comprises a mixture of kaolinite booklets with a smaller amount of delaminated kaolinite platelets, wherein the particles of the booklets are predominantly in the size range of 2 to 5 μm (e.s.d.) and are substantially free from particles larger than 10 μm, e.s.d., and the platelets are predominantly in the size range of 2 to 10 μm, e.s.d., preferably in the size range of 2 to 5 μm, e.s.d. The mixture of naturally-occurring kaolinite booklets and large artificially produced kaolinite platelets is associated with a restricted content of naturally-occurring or artificially created kaolinite particles that are finer than 2 μm, e.s.d. Preferably, the content of particles that are smaller than 2 μm, e.s.d., is in the range of about 40% to 60%, based on the weight of the clay composition.

One aspect of the invention relates to the use of the novel clay product of the invention as a coating pigment in the production of matte and dull-finish printing paper by means of a single-pass coating application utilizing conventional coating technology. Coating compositions of the invention contain as essential ingredients the novel pigment of the invention, adhesive and water. These coating compositions dry to a matte film (gloss of 0 to 15%, TAPPI, 75°). The coated matte-finish paper has a surface that is remarkably smooth considering the fact that the paper does not undergo calendering. The printing smoothness of the matte-finish sheets is comparable to that of the highest quality dull-finish sheets presently available. When the matte paper is supercalendered (conventionally) to gloss values in the dull-finish range, the printing smoothness of the dull-finish paper is exceptionally high, sometimes exceeding that of highly finished, glossy enamel paper. Conventional inks may be used to print dull and matte-finish papers prepared with the pigment of the invention. Contrary to the teachings of the prior art that large delaminated kaolin platelets contribute to high ink absorptivity (high "K&N" ink test values), the printed sheets containing our novel pigment tend to have high ink holdout.

Still another aspect of the invention involves the production of the pigment of the invention from one or more coarse-size fractions of kaolin clay which normally have limited commercial value. Both constituents of the pigment of the invention are obtained from coarse particle-size fractions of kaolin clay. The booklets of clay in the 2 to 5 μm e.s.d. particle-size range may be obtained by centrifuging or otherwise hydraulically classifying a coarse-size fraction of a kaolin clay crude to remove most particles larger than 5 μm from the coarse-size fraction of the crude clay. The large delaminated platelets are obtained by delaminating clay stacks in a coarse-size fraction of kaolin clay by known means, such as sand grinding, fractionating to recover the plus 2 μm e.s.d. fraction, subjecting the plus 2 μm fraction to further mechanical delamination unless the clay stacks were already well-delaminated in the initial delamination treatment, and further fractionating to remove particles larger than 10 μm, e.s.d.

Unless otherwise indicated, all particle sizes in the micrometer size range that are set forth in the specification and claims refer to values obtained by conventional Casagrande sedimentation method using 2.58 g./cm$^3$ as the value for relative density of clay particles. Those familiar with clay minerals will recognize that the diameter of well-delaminated kaolinite platelets as measured by microscopic techniques will differ from diameters computed from sedimentation rates.

DESCRIPTION OF THE PREFERRED EMBODIMENTS

Advantageously, the components of the pigment composition of the invention are produced from such by-products as the coarse-size fractions of kaolin clay that constitute the underflow streams when degritted kaolin clay crudes are fractionated in centrifuges to recover a No. 1 or No. 2 clay (fine particle-size fraction) in the overflow streams. To produce the component containing undelaminated booklets in the particle size range of 2 to 5 μe.s.d., (so-called "−5 μm undelaminated clay"), such underflow is diluted with water to a solids level suitable for further fractionation in a centrifuge, e.g., a solids level in the range of about 20% to 30% by weight. The centrifuge is operated at a speed and flow rate calculated so as to reject the desired amount of particles larger than 5 μm. The overflow from the centrifuge rejecting the +5 μm particles is recovered. The recovered fraction is acidified in a conventional manner to facilitate flocculation and water is decanted from the settled, flocculated suspension to produce a thickened suspension having a solids content suitable for bleaching (e.g., 10% to 30% solids).

The so-called "+2 μm delaminated clay" may be obtained from the same coarse-size fraction of clay used as the starting material to produce the −5 μm undelaminated clay. It may be advantageous to use a coarser clay as the starting material (a coarse size fraction containing a higher percentage of particles +2 μm and larger) in producing the +2 μm delaminated clay. Means for delaminating booklets or stacks of kaolin clay are well known in the art. Preferred are those methods which use a particulate grinding medium such as sand or glass microballoons. Incorporated by reference are the disclosures in the following patents relative to the delamination of coarse-size fractions of kaolin clay with sand or other particulate grinding media.

| | |
|---|---|
| U. S. 3,075,710 | I. L. Feld et al. |
| U. S. 3,097,801 | J. B. Duke |
| U. S. 3,171,118 | F. A. Gunn et al. |
| U. S. 3,615,806 | A. Torock et al. |
| U. S. 3,743,190 | J. B. Whitley |

After the clay stacks are delaminated by agitating the slurry of coarse clay with the selected grinding medium, the slip of clay is fractionated at 2 μm (e.s.d.) to remove particles 2 μm and finer. A centrifuge is preferred for commercial operation. Sedimentation may be used for test or bench-scale testing. The +2 μm fraction is recovered. The clay in the +2 μm fraction may be from 0 to 25% finer than 2 μm e.s.d. Typically the delaminated clay is from 10% to 20% by weight finer than 2 μm. In some cases the clay stacks in the +2 m fraction are sufficiently delaminated for blending with the −5 μm undelaminated cut. In the event that a preponderating amount of the +2 μm particles are not delaminated, the +2 μm fraction of partially delaminated clay should undergo further delamination one or more times as described, for example, in U.S. Pat. No. 3,615,806, until most of the particles, e.g., 80% to 90%, are delaminated. Simple microscopic observation can be used to estimate the degree of delamination. Undelaminated kaolinite stacks can be distinguished from thin delaminated kaolin platelets by microscopic techniques known in the clay industry. After fractionating a slurry of well-delaminated platelets to remove particles finer than 2 μm, the +2 μm fraction is further fractionated to remove particles larger than 10 μm. If desired, the delaminated clay can be fractionated at a finer particle size, e.g., 7 to 9 μm or as fine as 5 μm. The glossing potential of the delaminated clay increases undesirably as the cutoff point is shifted towards smaller particle sizes. Thus, it is preferable to cut delaminated clay at 8 to 10 μm rather than 5 μm. Furthermore, fractionation of the delaminated clay at about 5 μm rather than 8 to 10 μm results in a greater loss of valuable clay. If desired, the delaminated clay may be fractionated to remove excessively large platelets before the clay is fractionated to remove particles 2 μm and finer.

The slurry of fractionated delaminated clay can be blended with the slurry of −5 μm undelaminated clay and the mixture flocculated by adding acid and/or alum, followed by bleaching, filtration, drying and pulverization. Alternatively, the filter cake can be redispersed and spray dried. If desired, the components of the clay mixture can be separately bleached, filtered, dried and pulverized or the filter cake can be spray dried.

In a vatiation of the processing scheme, the components can be fractionated simultaneously to remove particles larger than 5 μm. In carrying out this embodiment of the invention, a slurry of well-delaminated coarse clay is fractionated to remove minus 2 μm particles (e.g., 0 to 25% minus 2 μm), blended with conventional coarse filler clay (e.g., clay that is 20% to 40% minus 2 μm and is 50% to 75% plus 5 μm) and a slurry of the mixture of clays is centrifuged to remove delaminated and undelaminated particles larger than 5 μm. A fraction that is at least 85% by weight (preferably about 90% by weight) finer than 5 μm and 40% to 50% finer than 2 μm is recovered as an overflow from the centrifuge. The recovered product is thickened if necessary, bleached, filtered, dried and pulverized in conventional manner.

The +2 μm delaminated platelets are employed in amount within the range of 5 to 30 parts by weight to 95 to 70 parts by weight of the −5 μm fraction of coarse undelaminated kaolin clay. Presently preferred are mixtures containing about 15 parts by weight of +2 μm platelets to 85 parts by weight of −5 μm fraction of coarse undelaminated clay. When an insufficient proportion of +2 μm delaminated platelets are present in the mixture, the coated sheets lack the desired smoothness and the printed sheets may be prone to exhibit mottle. On the other hand, aqueous slurries of the pigment tend to become increasingly dilatant as the proportion of delaminated clay increases.

Following in table form are particle size distributions for typical components of the pigment of the invention and for the pigment of the invention. For the sake of simplicity, the components are identified in the table as "−5 μm undelaminated" and "+2 μm delaminated." Also given in the table are typical particle-size distributions for suitable starting clay.

| TYPICAL PARTICLE SIZE DISTRIBUTIONS,[1] MICROMETER, e.s.d. | | | | | |
|---|---|---|---|---|---|
| | Weight Percent, Finer Than | | | | |
| | −20 μm | −10 μm | −5 μm | −2 μm | −1 μm |
| Starting clay[2] | 95–100 | 75–90 | 50–75 | 15–55 | 10–50 |
| −5 μm undelaminated clay | 100 | 98–100 | 89–92 | 45–60 | 20–30 |
| +2 μm delaminated clay | 100 | 90–100 | 60–90 | 0–25 | 0–5 |
| Mixture of delaminated and undelaminated clay | 100 | 96–100 | 88–92 | 45–60 | 20–30 |

[1]All sizes refer to values obtained by conventional sedimentation method
[2]Coarse particle size fraction of kaolin clay, e.g., filler grade The clay pigment of the invention may be utilized in conventional manner to produce coating colors. For example, the clay can be slurried at about 68% to 70% solids with water containing a suitable amount of clay dispersant, such as tetrasodium pyrophosphate. Conventional clay binders (adhesives) may be used in producing coating formulations. Criteria for selecting clay binders and binder levels are known to those in the paper coating art. The effect of binder level on coating gloss is known in the art. For example, higher binder levels lower the coating gloss. An objective of the invention is to minimize gloss. Hence binders should be selected with this in mind. It is also known that the binder system affects printability, e.g., ink holdout and set-off. Depending on the printing ink that is used, a binder which minimizes ink set-off may be preferred. Recommended binders include, by way of example, polyvinyl acetate latexes, styrene-butadiene latexes and mixtures thereof with starch or protein.

Conventional paper basestock and coating equipment such as the basestock and equipment for making enamel-finish sheets may be employed in practicing the invention. As shown in the illustrative examples, matte-finish coated sheets are produced without calendering. Dull-finish sheets can be obtained by supercalendering the dried sheets in a conventional manner.

The following examples are given to illustrate further the practice of the invention. The example illustrates the production of a representative pigment of the invention and the use of the pigment in the production of dull and matte-finish printing papers.

A. Preparation of Booklet-Containing −5 μm Fraction of Kaolin

The starting clay for the production of this constituent of the pigment was a commercial bleached filler grade ("NoKarb") of kaolin clay. The "NoKarb" was obtained by centrifuging a degritted soft Georgia kaolin crude in a Bird centrifuge and removing a fine coating clay in the overflow stream. The coarse-size fraction contained in the underflow stream was recovered. The underflow was bleached with zinc hydrosulfite and screened through a 325 mesh screen. The particle size of the resulting "NoKarb" filler clay was as follows: 96% by weight finer than 20 μm; 78% finer than 10 μm; 50% minus 5 μm; 20% minus 2 μm; 10% minus 0.6 μm. In effect, the NoKarb clay used to prepare the −5 μm fraction was a polydisperse clay material containing about 80% by weight of +2 μm kaolinite booklets and 20% by weight of minus 2 μm kaolinite platelets.

To prepare the dry NoKarb clay for fractionation to remove +5 μm particles, the dry clay was mixed with water to form a 65% solids slurry. The water contained tetrasodium pyrophosphate dispersant at an addition level of 0.45% based on the weight of the clay. The slurry of NoKarb was diluted with water to 30% solids and charged to a Bird centrifuge operated at a speed of 750 r.p.m. (corresponding to a gravity level of 50). Feed rate was 0.5 gallons per minute. The overflow product containing the −5 μm fraction of the NoKarb was recovered at about 14% solids and represented about 33% by weight of the NoKarb feed clay. The −5 μm fraction was flocced by adding a 25% solution of alum in amount sufficient to reduce the pH of the clay slurry to 4.5. Sulfuric acid was then added to reduce pH to 2.8. The flocced material was filtered, washed, dried at about 180° F. and pulverized in a Fitz mill through a 0.033 inch screen.

The −5 μm fraction of NoKarb obtained by this processing had the following particle size distribution: 100% minus 15 μm; 98% minus 10 μm; 95% minus 7.5 μm; 92% minus 5 μm; 74% minus 3 μm; 59% minus 2 μm; 50% minus 1.5 μm; 32% minus 0.6 μm. Thus, the −5 μm fraction of NoKarb was composed of about 40% by weight of booklets larger than 2 micrometers, of which a predominating amount (about 80% by weight) were in the range of 2 to 5 μm. About 60% by weight was composed of fine platelets (minus 2 μm particles).

B. Preparation of +2 Micrometer Fraction of Delaminated Kaolin Clay

The starting material used to prepare the coarse delaminated clay constituent of the pigment was a coarse-size fraction of a degritted soft Georgia kaolin crude. The coarse-size fraction of kaolin was obtained by centrifuging degritted crude in a Bird centrifuge to remove the minus 2 μm coating clay fraction, substantially as described under part A. The underflow was passed through a drag box to remove oversized particles. To prepare the slurry of coarse particle size of undelaminated clay for delamination, the slurry was dispersed in water at about 30% solids with tetrasodium pyrophosphate in amount of 0.1% based on the clay. The clay booklets were delaminated by passing the dispersed slurry of coarse clay into a commercial sand grinding mill ("Red Head ®"). The grinding medium was 20/40 mesh sand. The clay slurry was passed through the mill at a flow rate (2 g.p.m.) selected to result in a high degree of delamination with minimal generation of additional minus 2 μm particles. The discharge from the grinding mill was 100% finer than 20 μm; 95% finer than 10 μm; 84% finer than 5 μm; and 58% finer than 2 μm.

Oversized and undersized particles were then removed from the slip of delaminated clay by controlled sedimentation. To prepare the slip of delaminated clay for sedimentation, the solids were reduced to 10% and soda ash was added to increase pH to 8.5. Sodium silicate was then added to pH 9.0. Initially the slip of delaminated clay was fractionated by multiple sedimentation to remove particles 2 μm and finer. The coarse sedimented fraction of delaminated clay platelets was recovered and processed to remove particles larger than 9 μm. To remove the large particles, the recovered coarse and fraction was slurried in water at about 10% solids and pH was adjusted to 9.0 with sodium silicate. The dispersed slip was fractionated at 9 μm by multiple sedimentation. The +2 μm to 9 μm fraction of delaminated clay platelets was separated from the sedimented plus 9 μm particles. The slip of delaminated clay was flocced to pH of 3.0 with sulfuric acid, filtered and washed.

As determined by sedimentation, the recovered +2 μm to 9 μm delaminated clay product was 100% finer than 20 μm; 90% finter than 10 μm; 83% finer than 7 μm; 69% finer than 5 μm; 50% finer than 3.9 μm; 20% finer than 2.0 μm and 10% finer than 1.5 μm. In other words, the product was composed predominantly of delaminated platelets in the size range of 2 to 10 μm (as determined by sedimentation). Under a microscope, most of the particles seemed to be in the range of 3 to 5 micrometers. The product is referred to as the "+2 μm delaminated fraction".

C. Preparation of Mixture of −5 μm Fraction of NoKarb and +2 μm Delaminated Clay The washed and filtered delaminated clay from part B was reslurried in water and a sufficient amount of the −5 μm fraction of NoKarb clay from part A was added to the slurry to bring the weight ratio of −5 μm NoKarb clay to +2 μm delaminated clay to 85/15. The slurry was diluted with water to 25% solids, flocced with sulfuric acid to pH 2.8 and bleached with sodium hydrosulfite. The slurry was filtered, washed, dried and pulverized in a Fitz mill with a 0.033 inch screen. The bleached product had a brightness of 83.5% (G.E. block brightness). The particle size distribution of the mixture was as follows: 100% minus 15 μm; 96% minus 8 μm; 88% minus 5 μm; 70% minus 3 μm; 52% minus 2 μm; 42% minus 1.5 μm; 33% minus 1.0 μm; 22% minus 0.5 μm and 10% minus 0.2 μm.

D. Preparation of Paper Coating Compositions

The experimental pigment from part C (85% by weight −5 μm coarse fraction and 15% by weight +2 μm delaminated platelets) was dispersed in water at 68.1% solids. Tetrasodium pyrophosphate (0.25% based on pigment weight) was used as the dispersant. The resulting suspension and a pH of 6.1.

A coating color suitable for an offset paper (Formula A) was prepared by mixing one portion of the 68% solids pigment slurry with starch ("Penford Gum 280") and styrene butadiene ("Dow 620" latex), using 10 parts by weight starch, 6 parts by weight "Dow 620" to 100 parts by weight of clay pigment. To improve runability, calcium stearate ("Nopcote" C104) was added in amount of 0.5 parts by weight per 100 parts by weight of clay pigment. Sodium hydroxide was added to the composition to adjust pH to 7.0. The coating color was at 57.8% solids.

Another portion of the pigment slurry was formulated into a 57.8% solids coating color containing a different binder system (Formula B). Formula B contained 8.5 parts by weight Penford Gum 280, 8.5 parts by weight Dow 636 latex and 0.5 parts by weight "Nopcote" C104 per 100 parts by weight of clay.

Rheological properties of the clay-water slurry and starch-latex coating colors are reported in Table I.

TABLE I
CLAY-WATER AND COATING COLOR VISCOSITIES

TABLE I-continued

| Clay-Water Viscosity | | |
| --- | --- | --- |
| Solids, % | | 68.1 |
| TSPP, % | | 0.25 |
| Brookfield Viscosity, Spindle No. 3 | | |
| 10 r.p.m., cps | | 150 |
| 20 r.p.m., cps | | 100 |
| 100 r.p.m., cps | | 140 |
| Hercules End Point, r.p.m./16 dyne-cm. × $10^5$ | | 325 |
| Coating Color Viscosities | Formula A | Formula B |
| Brookfield Viscosity, Spindle No. 5 | | |
| 10 r.p.m., cps | 5100 | 4300 |
| 100 r.p.m., cps | 1600 | 1300 |
| Hercules End Point, dyne-cm. × $10^5$/2200 r.p.m. | 31.0 | 31.6 |

E. Preparation of Matte and Dull-Finish Printing Papers

Coating color formulations A and B were separately blade-coated on one side of commercial paper basestock ("Starflex") at cost weights of about 7.7 lbs./3300 ft.$^2$. The basestock used had a basis weight of 59 lbs./3300 ft.$^2$. A Keegan coater was employed. A portion of the dried coated sheets was evaluated for use as matte-finish printing paper. Other portions of the dried sheets were supercalendered two or three nips at room temperature under a load of 500 lbs. per lineal inch. The dull and matte-finish sheets were evaluated by tests well known in the industry to determine whether the sheets met criteria for dull and matte-finish printing papers. The tests used to measure gloss, opacity, brightness and K&N ink holdout are set forth in U.S. Pat. No. 3,850,653 to William E. Zentz, Jr. Printing roughness was measured by the "Printing Solids Roughness Index" (PSRI) test described in a publication of Adam F. Kaliski, "TAPPI," Vol. 56, No. 11, November 1973. It will be noted that printing roughness is reported in units of micrometers. Printing smoothness varies inversely with PSRI values. In other words, the lower the Printing Solids Roughness Index, the smoother the paper.

Results for matte-finish coated sheets appear in Table II. Table III summarizes results for dull-finish coated sheets. Properties of selected commercial matte-finish and dull-finish sheets are also reported in the tables for purposes of comparison.

The results, summarized in Tables II and III, indicate that acceptable matte and dull-finish printing papers were obtained with both coating for formulations using the experimental pigment and that the sheets were generally at least as good as the commercial matte and dull-finish sheets. The matte-finish sheets produced with the pigment of the invention (Table II) were generally comparable in gloss, brightness and pick to the commercial sheets. Opacity was lower, but at acceptable levels. The dull-finish sheets produced with the pigment of the invention (Table III) were slightly higher in gloss than the commercial dull sheets and lower in brightness and opacity. The printing smoothness (inverse of PSRI) of the matte-finish sheets (Table III) was superior to that of the commercial matte sheets.

TABLE II
MATTE-FINISH COATED SHEET PROPERTIES

| | Formula A | Formula B | Commercial Matte Sheet* |
| --- | --- | --- | --- |
| Coat Weight | 7.7 ± 0.1 lbs./3300 ft.$^2$** | | not available |

TABLE II-continued
MATTE-FINISH COATED SHEET PROPERTIES

|  | Formula A | Formula B | Commercial Matte Sheet* |
|---|---|---|---|
| 75° Gloss, % | 9 | 10 | 11 |
| Elrepho Brightness, % | 81.4 | 81.3 | 80.6 |
| Opacity, % | 92.5 | 92.2 | 95.8 |
| IGT Pick, VVP | 134 | 142 | 144 |
| K&N Δ % | 26 | 21 | 33 |
| Printing Evaluation Wedge Prints - Holdfast Halftone Ink PSRI, μm | 3.6 | 3.7 | 4.1 |

*coated two sides, 70 lbs./3300 ft.² basis weight
**coated one side, 59 lbs./3300 ft.² basis weight
REMARK:
Brightness, opacity and IGT of the experimental and commercial sheets are not directly cross-comparable because of a major basis-weight difference favoring the commercial sheet.

TABLE III
DULL-FINISH COATED SHEET PROPERTIES

|  | Formula A | Formula B | Commercial Dull Sheet* |
|---|---|---|---|
| Coat Weight | 7.7 ± 0.1 lbs./3300 ft.²** | | not available |
| Supercalendered Room Temp., 500 p.l.i., No. of nips | 3 | 2 | not available |
| 75° Gloss | 29 | 32 | 26 |
| Elrepho Brightness, % | 80.9 | 80.7 | 84.4 |
| Opacity, % | 92.2 | 91.7 | 96.1 |
| IGT Pick, VVP | 112 | 118 | 150 |
| K&N, Δ % | 23 | 17 | 32 |
| Printing Evaluation Wedge Prints - Holdfast Halftone Ink PSRI, μm | 2.3 | 2.5 | 3.2 |

*coated two sides, 84 lbs./3300 ft.² basis weight
**coated one side, 59 lbs./3300 ft.² basis weight
REMARK:
The same as in Table II

We claim:

1. A method for producing matte-finish clay-coated printing paper which comprises forming an aqueous slurry of a pigment comprising a mixture of (a) a minor percentage of mechanically delaminated particles of kaolin clay which are larger than 2 μm and finer than 10 μm and (b) a major weight percentage of a coarse-size fraction of naturally-occurring kaolin clay which has not undergone delamination and wherein substantially all of the particles are finer than 10 μm, from 40% to 60% by weight are finer than 2 μm and the particles larger than 2 μm are composed of kaolinite stacks preponderantly in the size range of 2 μm to 5 μm, mixing said slurry with an aqueous paper coating adhesive to form a coating composition, applying the coating composition to paper and drying the paper thus coated without calendering the paper.

2. A method for producing dull-finish clay-coated printing paper which comprises forming an aqueous slurry of a pigment comprising a mixture of (a) a minor weight percentage of mechanically delaminated particles of kaolin clay which are larger than 2 μm and finer than 10 μm and (b) a major weight percentage of a coarse-size fraction of naturally-occurring kaolin clay which has not undergone delamination and wherein substantially all of the particles are finer than 10 μm, from 40% to 60% by weight are finer than 2 μm and the particles larger than 2 μm are composed of kaolinite stacks preponderantly in the size range of 2 μm to 5 μm, mixing said slurry with an aqueous paper coating adhesive to form a paper coating composition, applying the coating composition to paper, drying the paper thus coated and supercalendering the coated paper.

3. A low gloss coated printing paper having improved optical and printing properties, said printing paper comprising paper and a smooth coating thereon of adhesive-bound clay particles, said clay particles comprising (a) from 5 to 30 parts by weight of mechanically delaminated particles of kaolin clay, the particles of which range in size from 2 μm to 10 μm and are predominantly in the size range of 2 μm to 5 μm and (b) from 95 to 70 parts by weight of a coarse particle-size fraction of kaolin clay which has not undergone mechanical delamination, said course-size fraction being essentially free from particles coarser than 10 μm and containing from about 88% to 94% by weight of particles finer than 5 μm and from about 40% to 60% finer than 2 μm.

4. The printing paper of claim 3 wherein said mixture of clay particles contains from 45% to 60% by weight of particles finer than 2 μm.

5. The printing paper of claim 3 wherein the delaminated clay component (a) has a particle size distribution in weight percent as follows: 90-100% finer than 10 μm; 60-90% finer than 5 μm; 0-25% finer than 2 μm.

6. The printing paper of claim 3 wherein the undelaminated clay component (b) has a particle size distribution in weight percent as follows: 98-100% finer than 10 μm; 89-92% finer than 5 μm; 45-60% finer than 2 μm.

7. The printing paper of claim 3 wherein the total mixture of kaolin clay particles has a particle size distribution in weight percent as follows: 96-100% finer than 10 μm; 88-92% finer than 5 μm; 45-60% finer than 2 μm; and 20-30% finer than 1 μm.

8. The printing paper of claim 3 wherein the total mixture of kaolin clay particles has a particle size distribution in weight percent as follows: 100% finer than 15 μm; 88% finer than 5 μm; and 52% finer than 2 μm.

9. The printing paper of claim 3 which has a gloss in the range of 0 to 15% (TAPPI, 75°).

10. The printing paper of claim 9 wherein said paper is uncalendered.

11. The printing paper of claim 3 which has a gloss in the range of about 20% to 35% (TAPPI, 75°).

12. The printing paper of claim 11 wherein said paper is calendered.

13. The printing paper of claim 3 wherein said aqueous paper coating adhesive is selected from known adhesives which minimize ink set-off in the coated printing paper.

14. The printing paper of claim 13 wherein said adhesive is selected from the group consisting of polyvinyl acetate latexes, styrene-butadiene latexes and mixtures thereof with starch or protein.

15. The printing paper of claim 3 further containing a starch.

* * * * *

UNITED STATES PATENT OFFICE
CERTIFICATE OF CORRECTION

PATENT NO. : 4,241,142
DATED : December 23, 1980
INVENTOR(S) : Adam F. Kaliski et al It is certified that error appears in the above-identified patent and that said Letters Patent are hereby corrected as shown below:

Column 9 - line 2 should read -- coarse end fraction --.

Column 10 - line 22 should read -- ("Starflex")at coat weights --.

Column 11 - line 39 should read -- slurry of a pigment comprising a mixture of (a) a minor weight percentage --.

Signed and Sealed this

Seventeenth Day of March 1981

[SEAL]

Attest:

RENE D. TEGTMEYER

Attesting Officer

Acting Commissioner of Patents and Trademarks